United States Patent [19]

Komatsuzaki et al.

[11] Patent Number: 4,908,642
[45] Date of Patent: Mar. 13, 1990

[54] CAMERA

[76] Inventors: Hiroshi Komatsuzaki, 2-26-30 Nishi-azabu, Minato-ku, Tokyo, Japan; Seiji Asano, 1-324 Uetake-cho, Omiya-shi, Saitama, Japan; Yoshihiro Fujita, 2-26-30 Nishi-azabu, Minato-ku, Tokyo, Japan

[21] Appl. No.: 357,681

[22] Filed: May 26, 1989

Related U.S. Application Data

[63] Continuation of Ser. No. 181,539, Apr. 15, 1988, abandoned.

[30] Foreign Application Priority Data

Apr. 20, 1987 [JP] Japan ................................. 62-97871
Apr. 20, 1987 [JP] Japan ................................. 62-97872

[51] Int. Cl.⁴ ............................................. G03B 3/00
[52] U.S. Cl. ..................................... 354/400; 354/402
[58] Field of Search ............... 354/400, 401, 402, 403, 354/406, 409, 412

[56] References Cited

U.S. PATENT DOCUMENTS

| | | | |
|---|---|---|---|
| 4,344,679 | 8/1982 | Yagi et al. | 354/409 |
| 4,470,683 | 9/1984 | Nakajima | 354/406 |
| 4,593,987 | 6/1986 | Takahashi et al. | 354/402 |
| 4,618,235 | 10/1986 | Ishida et al. | 354/406 |
| 4,723,139 | 2/1988 | Ogasawara | 354/402 |
| 4,724,455 | 2/1988 | Suzuki et al. | 354/412 |
| 4,734,730 | 3/1988 | Ootsuka et al. | 354/402 |
| 4,786,934 | 11/1988 | Kunze et al. | 354/409 |
| 4,792,819 | 12/1988 | Akashi | 354/400 |
| 4,825,238 | 4/1989 | Akashi | 354/402 |

Primary Examiner—Russell E. Adams
Attorney, Agent, or Firm—Young & Thompson

[57] ABSTRACT

A camera which is capable of varying a photographable distance range according to photographic conditions to realize a sure photographing without losing a photographic chance under the photographic condition that can provide a practicable image. In the camera, even if a light measurement value is smaller than a first reference value Sev to allow a strobe to automatically emit light, the distance range for focusing is not limited when the light measurement value is greater than a second reference value or the lowest limit value of the image surface light amount that can provide a practicable image quality in exposure. The camera is sure to be able to photograph when the image surface light amount is available to such an degree that a practicable image quality can be obtained in the strobe automatic light emission.

5 Claims, 4 Drawing Sheets

CAMERA

This application is a continuation, of application Ser. No. 181,539, filed 4/15/88 now abandoned.

BACKGROUND OF THE INVENTION

1. Field of the Invention

The present invention relates to a camera of an automatically focusing type and, in particular, to a camera which is provided with an alarm function to give an alarm when the distance from the photographic lens of the camera to an object is beyond the range of the photographable distance.

2. Description of the Related Art

Conventionally, as a camera having a distance alarm function, there have been known cameras which are provided with a near distance alarm function to give the alarm that the photographic lens of the camera is too near to an object, and cameras with a remote distance alarm function to give the alarm that the object is too remote for the strobe light to reach.

In either of the above-mentioned conventional cameras, the photographable distance range is set in a fixed manner, for example, it is set using as a full-aperture condition, so that a satisfactory image quality can be obtained even under the worst conditions. In other words, in the conventional cameras, even when the distance to the object can be a photographable distance according to photographic conditions, since the value of photographable distance range is set fixedly, an alarm is given uniformly when the distance to the object is out of the set distance range to make the photographing impossible, so that the user of the camera will lose the chance of photographing. This is a problem to be solved in the conventional cameras.

Also, in the conventional camera of an automatically focusing type which is provided with a strobe, the strobe is arranged to automatically emit light when the brightness of field is equal to or lower than a predetermined level, and also in the automatic light emission from the strobe if the distance to the object is out of the range of distance that the strobe light can reach, then an alarm is given uniformly to thereby make it impossible to focus on the object.

As in the above-mentioned conventional auto-focusing cameras, if the distance range for uniform focusing in the strobe automatic light emission is limited to the distance range that the strobe light can reach, then an alarm is given to thereby make the focusing impossible even when there is available the external light equal to the strobe light, for example, in a day light synchroflash photography in which the strobe is forced to give forth light in the backlight. Also, even when there is available the image surface light amount to such a degree that a practicable image quality can be obtained due to the latitude of a film, the alarm is given similarly to thereby prevent the focusing, so that the photographing is made impossible or the photographing is performed out of focus.

SUMMARY OF THE INVENTION

The present invention aims at eliminating the drawbacks found in the above-mentioned prior art cameras. Accordingly, it is an object of the invention to provide a camera which is capable of varying the photographable distance range in accordance with photographic conditions so that photographing can be performed even in a distance range in which photographing is impossible in the prior art.

In order to achieve the above object, according to one aspect of the invention, there is provided a camera provided with alarm means for giving an alarm to the effect that the distance to an object to be taken is out of the photographable distance range, the camera comprising: detection means for detecting the photographic conditions; distance measuring means for measuring the distance between the object and the photographic lens of the camera; and, control means which takes in the output signals of the detection means and distance measuring means and determines the photographable distance range corresponding to the photographic conditions in accordance with these output signals and also which drives the alarm means when the distance to the object is out of the thus determined photographable distance range.

In the camera according to the invention, if the photographic conditions are determined, then the photographable distance range can be determined according to the photographic conditions. Only when the distance to the object measured by the distance measuring means is out of the photographic distance range, an alarm is given.

It is another object of the invention to provide a camera of an automatically focusing type which is capable of photographing when there is available the image surface light amount to such a degree that a practicable image quality can be obtained in the automatic light emission by the strobe.

In attaining the above object, according to another aspect of the invention, there is provided an auto-focusing camera which is provided with strobe means for automatically emitting light when the brightness of field is lower than a predetermined brightness level and also which limits the distance range for automatic focusing on an object to the range that the light of the strobe can reach, the camera comprising: light measuring means for detecting the brightness of field; distance measuring means for the distance to the object; focusing means including a photographic lens system for focusing on the object; strobe control means for controlling the strobe to emit light; and, control means for taking in the detection output of the light measuring means to compare a light measurement value obtained based on the detection output with a first reference value Sev for deciding whether the strobe is allowed to perform the above-mentioned low brightness automatic light emission and a second reference value Lev which is the lowest limit value of the image surface light amount that can provide a practicable image quality (Lev < Sev), and for controlling the strobe control means and the focusing means such that the strobe is allowed to automatically give forth light when the light measurement value is smaller than the first reference value Sev and that, when the light measurement value is greater than the second reference value Lev, focusing is carried out regardless of whether the light measurement value is within the distance range that the strobe light can reach.

According to the auto-focusing camera of the present invention, when the light measurement value obtained by the light measuring means is lower than the first reference value Sev, the strobe control means for controlling the strobe to emit light is controlled such that the strobe is allowed to automatically emit light. In this case, prior to the automatic light emission of the strobe, if the above-mentioned light measurement value is greater than the second reference value Lev (Lev <Sev) which is the lowest limit value of the image surface light amount that can provide a practicable image quality, focusing on the object is performed and the object is photographed regardless of whether the distance to the object measured by the distance measuring means is within the distance range that the light of the strobe can reach.

BRIEF DESCRIPTION OF THE DRAWINGS

The exact nature of this invention, as well as other objects and advantages thereof, will be readily apparent from consideration of the following specification relating to the accompanying drawings, in which like reference characters designate the same or similar parts throughout the figures thereof and wherein.

DETAILED DESCRIPTION OF THE INVENTION

Detailed description will hereunder be given of the preferred embodiments of a camera according to the present invention with reference to the accompanying drawings.

Figure 1:
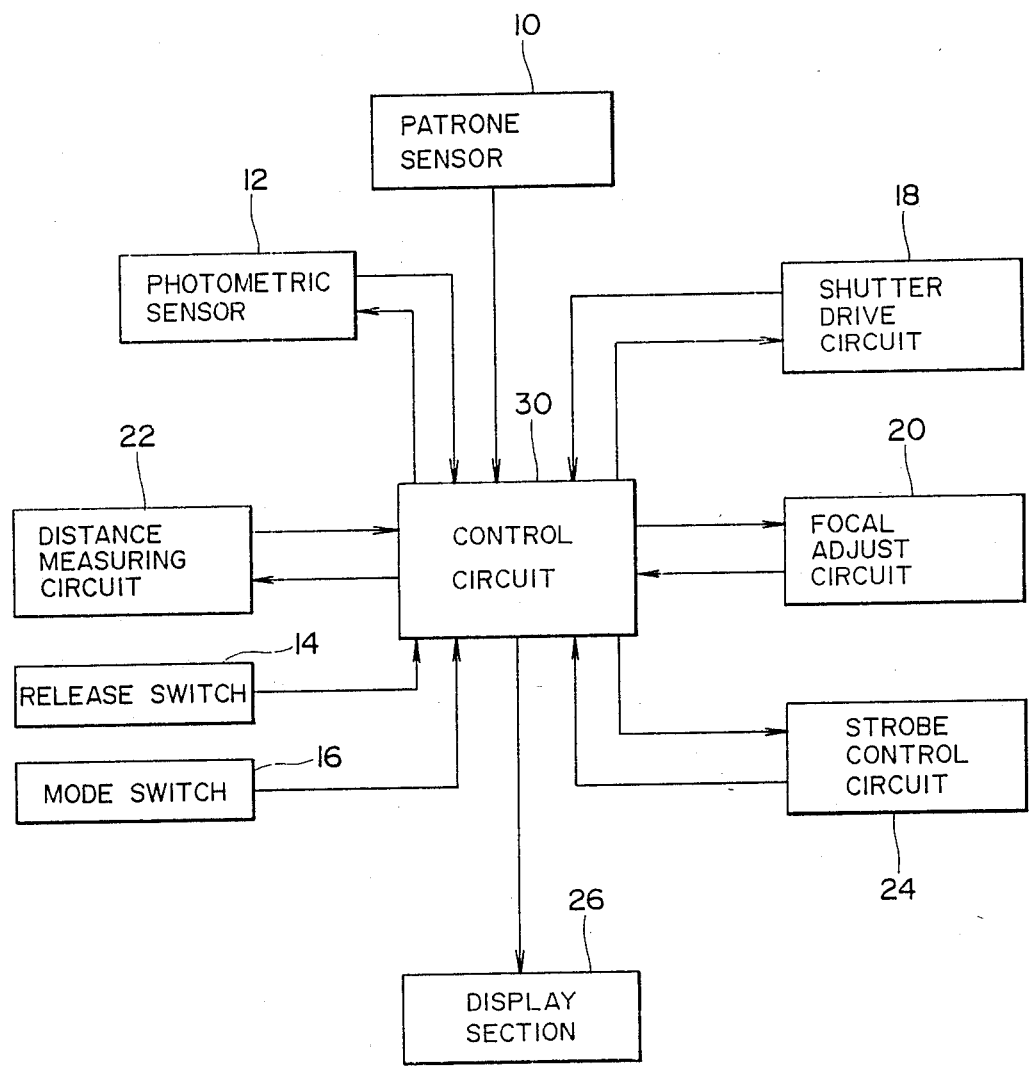
FIG. 1 is a block diagram to show the structure of the control circuit of a first embodiment of a camera according to the invention.

Referring first to FIG. 1, there is shown the structure of the circuit portion of a first embodiment of a camera constructed according to the present invention. In FIG. 1, reference numeral 10 designates a patrone sensor which is used to read information printed in a patrone in which a film is stored. When the patrone 10 is loaded into a main body of the camera, the information printed in the patrone is read by the patrone sensor 10 existing on the side of the camera main body and the film sensitivity information is read into a control circuit 30 to be described later. 12 designates a photometric sensor disposed in the camera main body for measuring the light of field; 14 a release switch; and, 16 a mode switch for setting up a photograph mode. The photograph mode includes a normal photograph mode in which normal photograph is performed by means of a stationary light (external light), a flash mode for photographing by means of a strobe light, and the like. 18 stands for a shutter drive circuit which drives a shutter at the shutter speed that is determined in accordance with various kinds of photographing conditions such as a lens stop-down value, a lens focal length, a light amount of image surface, a film sensitivity and the like.

Also, 20 represents a focal adjust circuit used to drive a photographing optical system including a photographic lens.

Further, 22 designates a distance measuring circuit which measures and calculates the distance from the photographic lens to the object to be taken, 24 represents a strobe control circuit which allows a strobe to emit light only during the time that is determined by the control circuit 30 when the shutter is released, and 26 stands for a display section for alarming and displaying to the effect that the distance to the object is out of the photographable distance range that is determined by the control circuit 30.

In addition, 30 designates a control circuit which is adapted to perform various kinds of controls on the photographing operations and which is composed of a microcomputer and the like.

Figure 2:
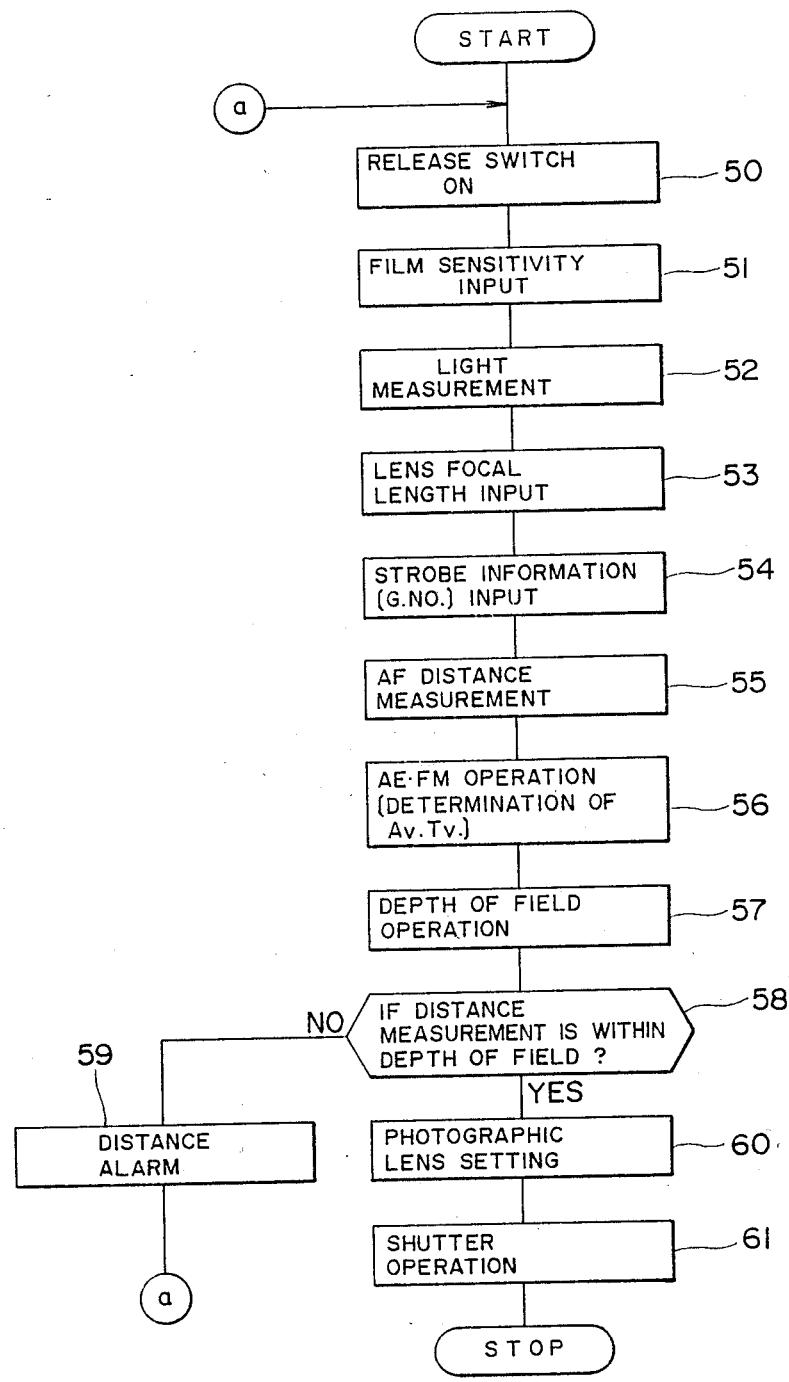
FIG. 2 is a flow chart to show the operation of the control circuit in FIG. 1.

Next, description will be given of the operation of the control circuit 30 in connection with FIG. 2. In FIG. 2, if a release button in the camera main body is depressed (Step 50) and the release switch 14 is turned on, then the film sensitivity information of the patrone for the film loaded in the camera main body is read by the patrone sensor 10 (Step 51). Next, the light measurement of the field is initiated and the detection output of the photometric sensor 12 is input to the control circuit 30 (Step 52). The photographing optical system of the camera is driven by the focal adjust circuit 20 such that it can be brought into focus on the object, and the focal length of the photographic lens system in focus is input (Step 53). Also, the data of a guide number (G. No.) of the strobe determined in accordance with the photographic conditions including diaphram and the like is input from the strobe control circuit 30 (Step 54) and the distance to the object is measured by the distance measuring circuit 22 (Step 55).

On the other hand, since the photographic mode is set to a flash mode (FM) using a strobe by the mode switch 16, in the control circuit 30, the exposure conditions (stop-down Av, shutter speed Tv) when using the strobe are operated (Step 56) and then the operation of the depth of field is carried out (Step 57). Further, whether the distance measurement value that is operated from the distance measurement information taken in from the distance measuring circuit 22 is present within the range of the depth of field operated in Step 57 is checked (Step 58). If the distance measurement value is present out of the range of the depth of field, it is decided that the distance from the photographic lens to the object is out of the range of the photographable distance (Step 59), so that the distance alarm display is issued to the display section 26 and at the same time the operation goes back to Step 51 (Step 59).

On the contrary, if the distance measurement value is present within the depth of field, then it is decided that the distance between the photographic lens and the object is within the range of the photographable distance, so that the photographing optical system including the photographic lens is driven by the focal adjust circuit 20 (Step 60). As a result of this, the automatic focusing is achieved and at the same time the shutter is operated by the shutter drive circuit 18 (Step 61).

In the illustrated embodiment, the depth of field is obtained by operating the diameter of a circle of confusion in accordance with the stop-down value that is calculated from various photographic data (light measurement value, film sensitivity, focal point of the photographing optic system and the like). Actually, the exposure value and the data of the diameter of the circle of confusion are stored in the form of a table within the control circuit 30.

In the above-mentioned embodiment, whether the distance between the photographic lens and the object is present within the range of the photographable distance is decided by whether the distance to the object is within the depth of field. However, the invention is not limited to this, but according to the invention, for example, the light amount of the whole image surface at the exposure time when an external light and a strobe light are applied may be obtained from various photographic data (such as the light measurement value, film sensitivity, guide number of the strobe, lens opening F value and the like), and, if the whole image surface light amount is found equal to or less than a predetermined value, it can be decided that the distance from the photographic lens to the object is out of the photographable distance range.

Also, according to the invention, the photographable distance range can be altered in accordance with not only the stop-down value at the time of exposure and the image surface light amount but also the focal length of the photographing optical system, film sensitivity and other photographic conditions mentioned above.

As described above, according to the invention, there is provided a camera which is constructed such that the photographable distance range can be varied in accordance with the photographic conditions. Therefore, the present camera is capable of surely photographing without losing the chance of photographing under the photographic conditions in which a practicable image can be obtained.

Figure 3:
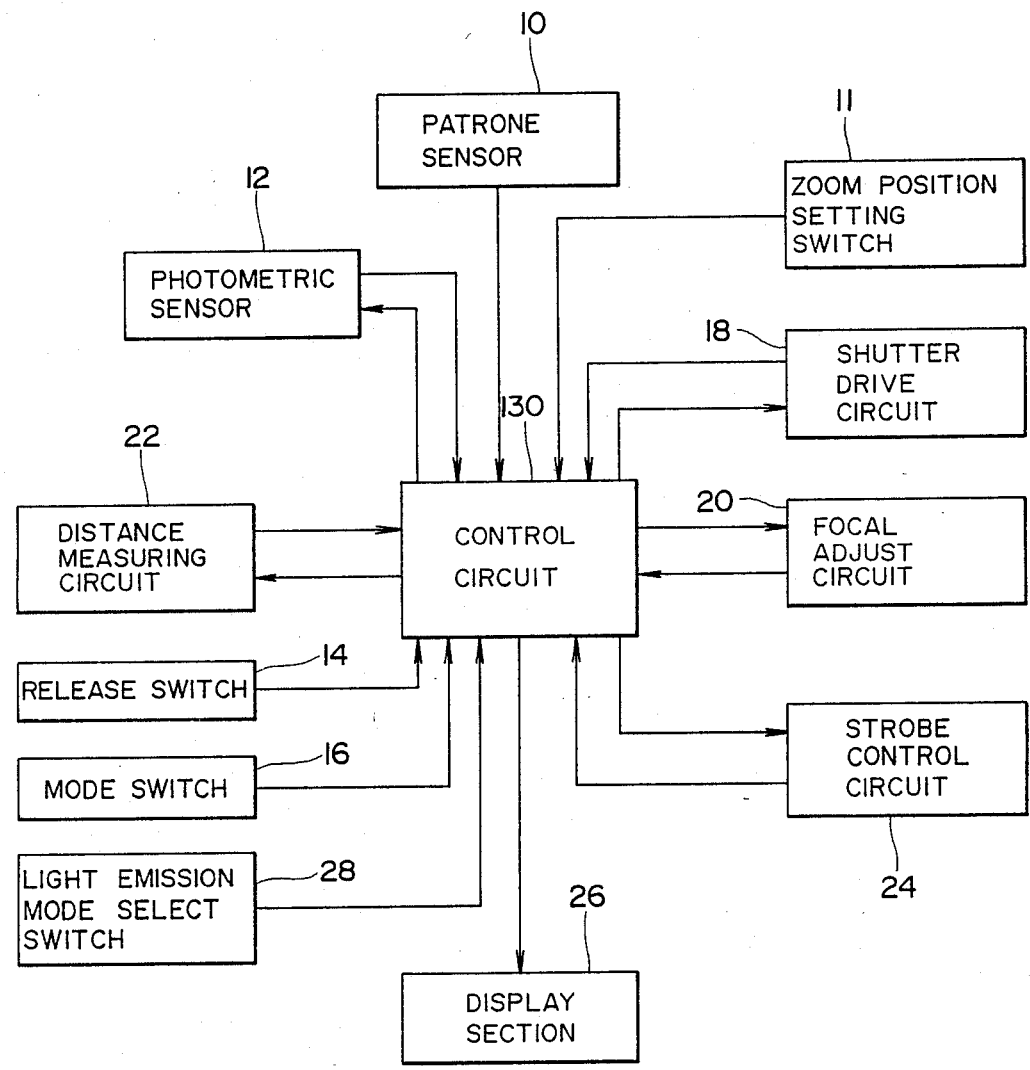
FIG. 3 is a block diagram to show the structure of the control circuit of a second embodiment of a camera according to the invention; and, FIG. 4 is a flow chart to show the operation of the control circuit in FIG. 3.
Figure 4:
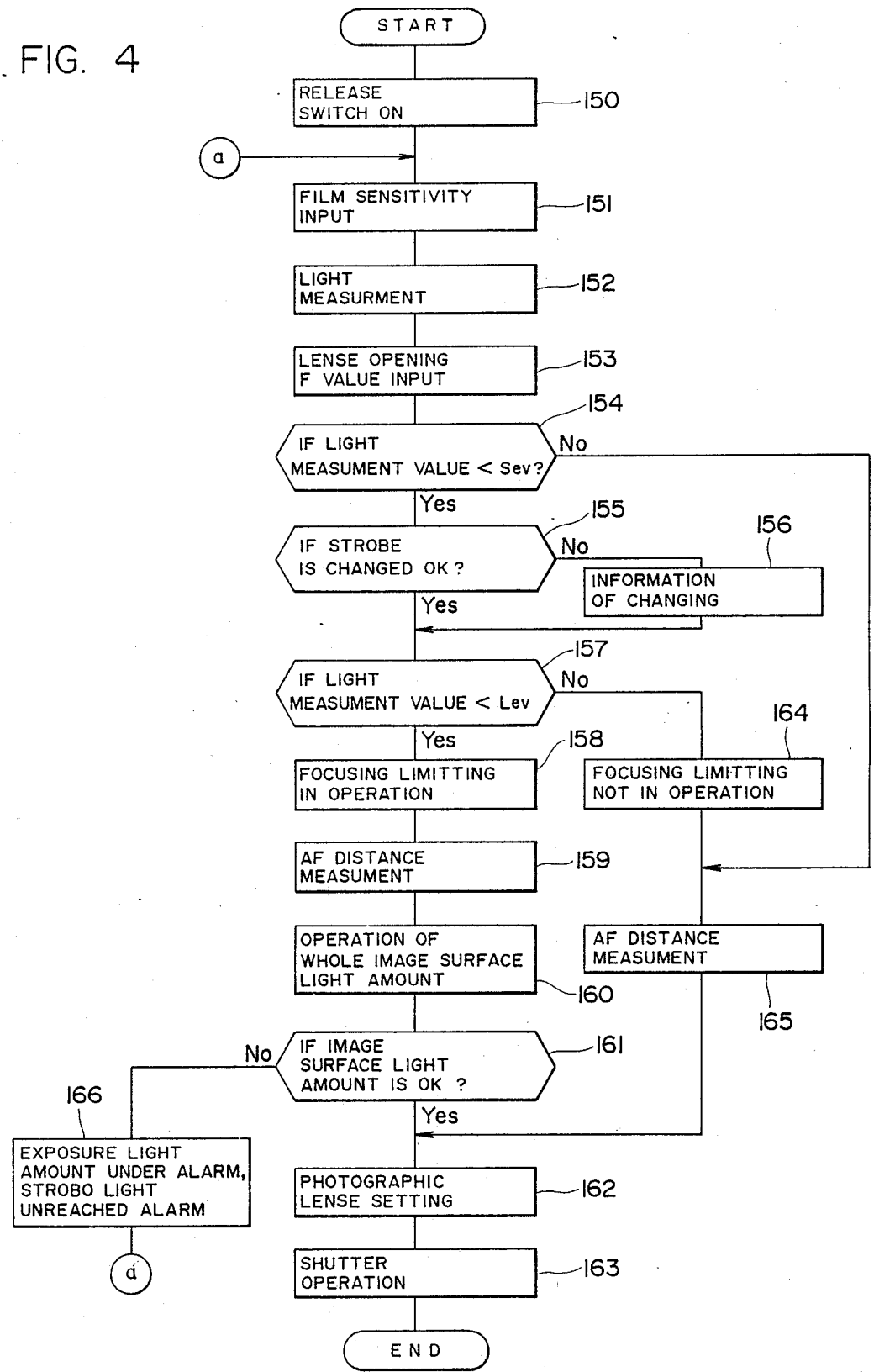

Now, description will be given below of a second embodiment of a camera according to the invention is connection with FIGS. 3 and 4. In the second embodiment of the invention shown in FIG. 3, the same parts as in the first embodiment in FIG. 1 are designated by the same reference numbers respectively and the detailed descriptions thereof are saved here. In the second embodiment, besides the parts employed in the first embodiment, there are provided a zoom position setting switch 11 and a light emitting mode selection switch 28.

The zoom position setting switch 11 is a switch for setting the zoom positions (such as telephotographic position, wide angle photographic position and the like) of the photographing optical system (zoom system). The light emitting mode select switch 28 is used to select the light emitting mode of the strobe and is capable of selecting either an automatic light emitting mode in which the strobe automatically emitts light if the brightness of field is equal to or lower than a predetermined level or a normal light emitting mode in which light can be emitted always when the shutter is released regardless of the photographing conditions.

Next, description will be given of the operation of the control circuit 130 in connection with FIG. 4. In this embodiment, it is assumed that the strobe is set to the automatic light emitting mode by the light emitting mode select switch 28. In FIG. 4, the release button in the camera main body is depressed to turn on the release button 14 (Step 150), then the film sensitivity information of the patrone of the film loaded into the camera main body is input by the patrone sensor 10. After then, the light measurement is initiated and detection output of the photometric sensor 12 is input to the control circuit 130 (Step 152).

In accordance with the detection output from the zoom position setting switch 11, the data of the full-aperture F value stored in the control circuit 130 is input according to the amount of advancing of the photographic lens (Step 153). Next, the light measurement value obtained from the detection output of the photometric sensor 12 is compared with a first reference value Sev which is used to decide whether the strobe is allowed to automatically emit light in a low brightness manner (Step 154), and, if the light measurement value is greater than the first reference value Sev, then the automatic light emission from the strobe is not necessary and the operation jumps to Step 165 (Step 165).

On the other hand, if the light measurement value is smaller than the reference value Sev, then the strobe automatic light emission is required and thus whether a charging condenser within the strobe control circuit 24 is charged is checked (Step 155). If the condenser is not charged, then the charging of the condenser is initiated (Step 156) and further the above-mentioned light measurement value is compared with a second reference value Lev with is the lowest limit value of the image surface light amount that can provide a practicable image quality (that is, whether Lev < Sev is checked) (Step 157). If the light measurement value is smaller than the second reference value Lev, then in focusing on the object it is necessary to operate a so called focusing limiting function to limit the focusing range Within the range of distance to which the light of the strobe can go (Step 158). In particular, a limit is given to the driving range of the photographing optical system including the photographic lens by the focal adjust circuit 20. Further, the distance to the object is measured by the distance measuring circuit 22 (Step 159) and after then the intensities of the external light and the strobe light as well as the latitude of the film are taken into consideration to calculate the whole image surface light amount (Step 160). When the whole image surface light amount calculated in Step 160 is insufficient for exposure, an alarm display to the effect is displayed on the display section 26 and the operation goes back to Step 151 (Steps 161, 166).

On the other hand, when the whole image surface light amount calculated in Step 160 is sufficient for exposure, the photographing optical system is driven by the focal adjust circuit 20 in such a manner that the focusing limiting function is in operation, thereby performing the automatic focusing, and thereafter the shutter is operated by the shutter drive circuit 18 (Steps 161, 162, 163).

Also, in Step 157, if the light measurement value is found greater than the second reference value Lev, then the above-mentioned focusing limiting function is removed (Step 164), the distance to the object is measured by the distance measuring circuit 22 (Step 165), and then the focusing on the object is performed by the focal adjust circuit 20 (Step 162).

As has been described hereinbefore, according to the invention, there is provided a camera of an automatically focusing type which is structured to allow a strobe to automatically emit light when the brightness of field (light measurement value) is equal to or lower than a predetermined level, wherein, even when the light measurement value is equal to or smaller than a first reference value Sev to allow the strobe to emit light, the distance range for focusing is not limited if the light measurement value is greater than a second reference value which is the lowest limit value of the image surface light amount that can provide a practicable image quality in exposure. Therefore, the camera according to the invention is capable of surely photographing when the image surface light amount is available to such a degree that a practicable image quality can be obtained in allowing the strobe to emit light.

It should be understood, however, that here is no intention to limit the invention to the specific forms disclosed, but on the contrary, the invention is to cover all modifications, alternate constructions and equivalents falling within the spirit and scope of the invention as expressed in the appended claims.

What is claimed is:

1. A camera comprising:
a detection means for detecting photographic conditions;
distance measuring means for measuring the distance between an object and a photographic lens;
focusing means including said photographic lens for focusing on said object; and,
control means responsive to output signals of said detection means and distance measuring means to determine a photographable distance range corresponding to said photographic conditions in accordance with said output signals, wherein said photographable distance range is determined based on whether a distance measurement value obtained by said distance measuring means is in a range of the depth of field.

2. A camera as set forth in claim 1, wherein said control means drives alarm means when the distance to said object is out of said photographable distance range determined.

3. A camera as set forth in claim 2, wherein said photographic distance range is determined by the amount of light in the field of view.

4. A camera as set forth in claim 3, wherein said light amount is obtained from the photographic conditions including the light measurement value, film sensitivity, strobe guide number and lens opening F value and wherein, when said light amount is equal to or lower than a predetermined value, said light amount is decided to be out of said photographable distance range.

5. A camera comprising:
(a) means for detecting ambient photographic conditions including a light measurement value and film sensitivity and for producing a first output signal in accordance with said detected conditions;
(b) means for measuring the distance between an object and a photographic lens of the camera and for producing a second output signal in accordance with said measured distance;
(c) focusing means for focusing said photographic lens on the object to determine a focal length and for producing a third signal in accordance with the focal length;
(d) control means connected with said detecting, measuring and focusing means for receiving and processing said first, second and third signals to determine a photographable distance range by calculating the diameter of a circle of confusion in accordance with a stop-down value calculated from the film sensitivity, light measurement value and focal length; and
(e) alarm means connected with said control means for producing an alarm when said measured distance is greater than said photographable distance range, whereby said photographable distance range varies in accordance with variations of said first, second and third signals.

* * * * *

UNITED STATES PATENT AND TRADEMARK OFFICE
CERTIFICATE OF CORRECTION

PATENT NO. : 4,908,642
DATED : March 13, 1990
INVENTOR(S) : Hiroshi KOMATSUZAKI et al.

It is certified that error appears in the above—identified patent and that said Letters Patent is hereby corrected as shown below:

On the title page of the patent, insert Item 73 as follows:

--[73] Assignee: Fuji Photo Film Co., Ltd., Kanagawa, Japan--.

Signed and Sealed this

Thirteenth Day of April, 1993

Attest:

STEPHEN G. KUNIN

Attesting Officer

Acting Commissioner of Patents and Trademarks